No. 832,681. PATENTED OCT. 9, 1906.
A. E. LIND.
BOOK STAPLING MACHINE.
APPLICATION FILED FEB. 6, 1905.
6 SHEETS—SHEET 2.
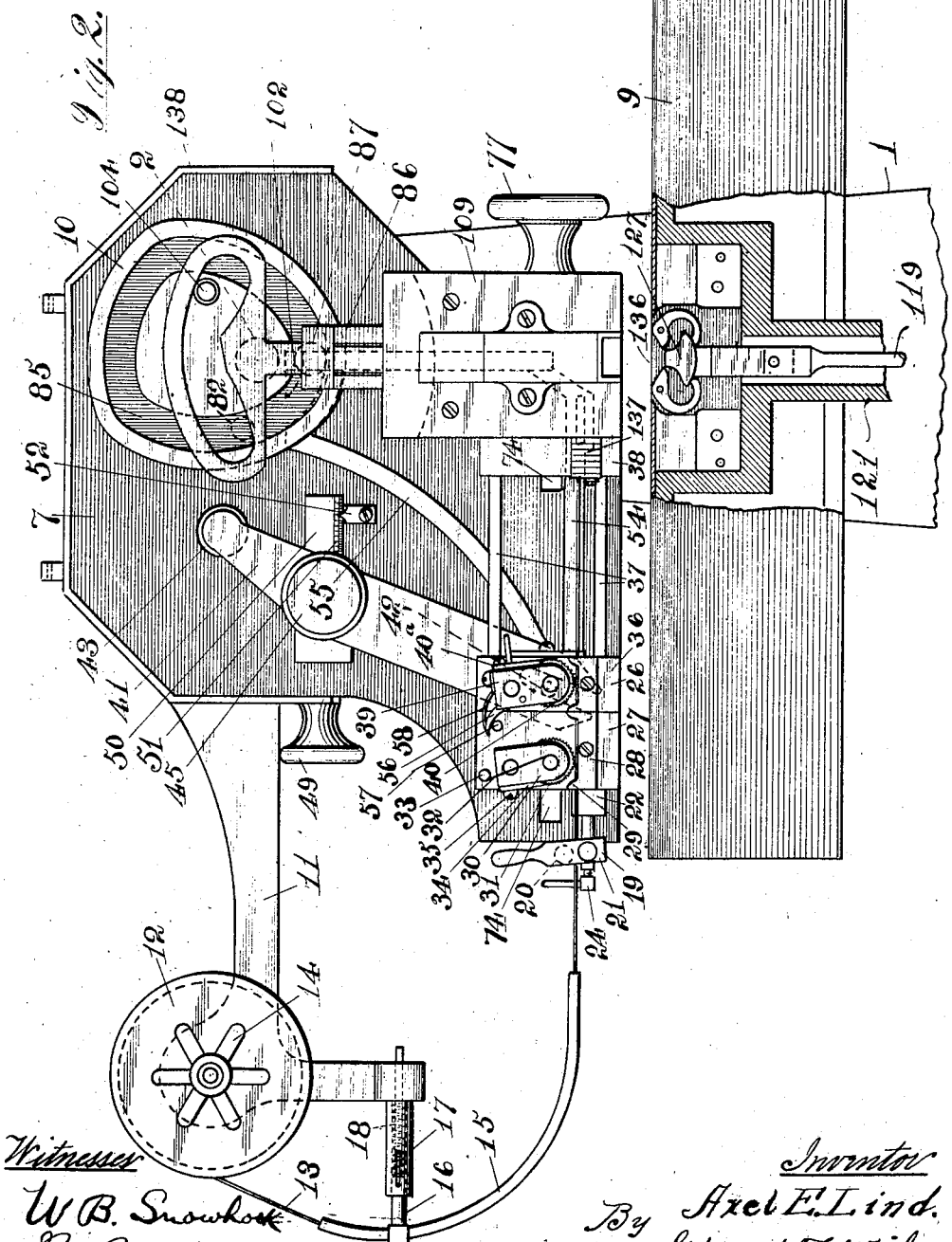

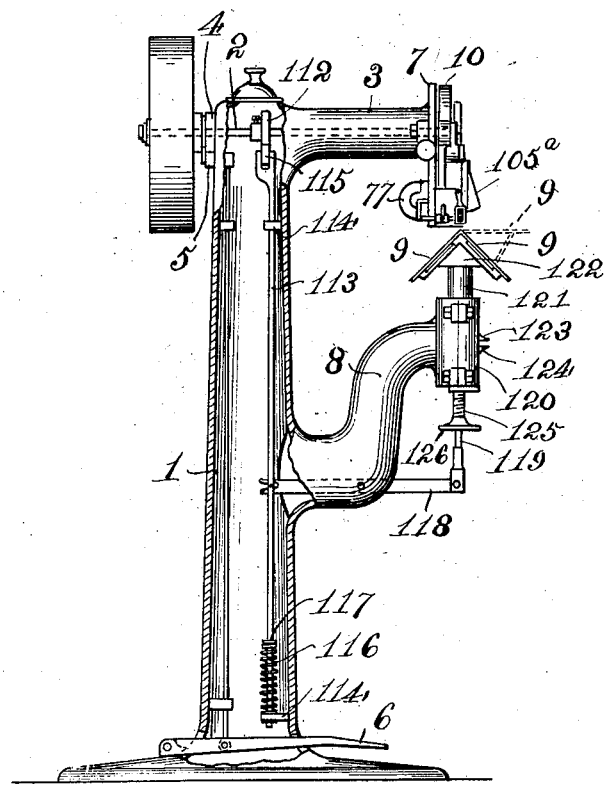

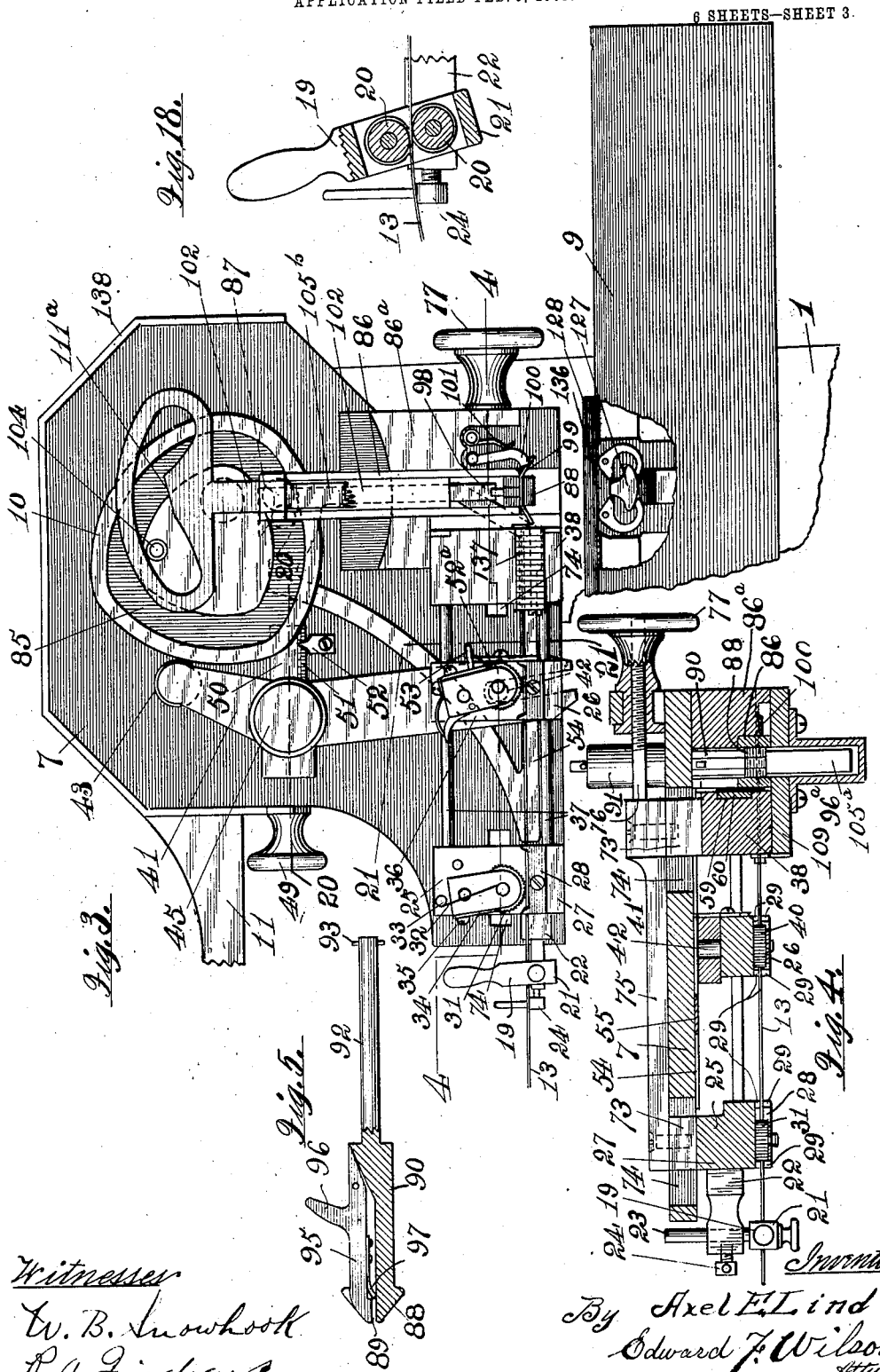

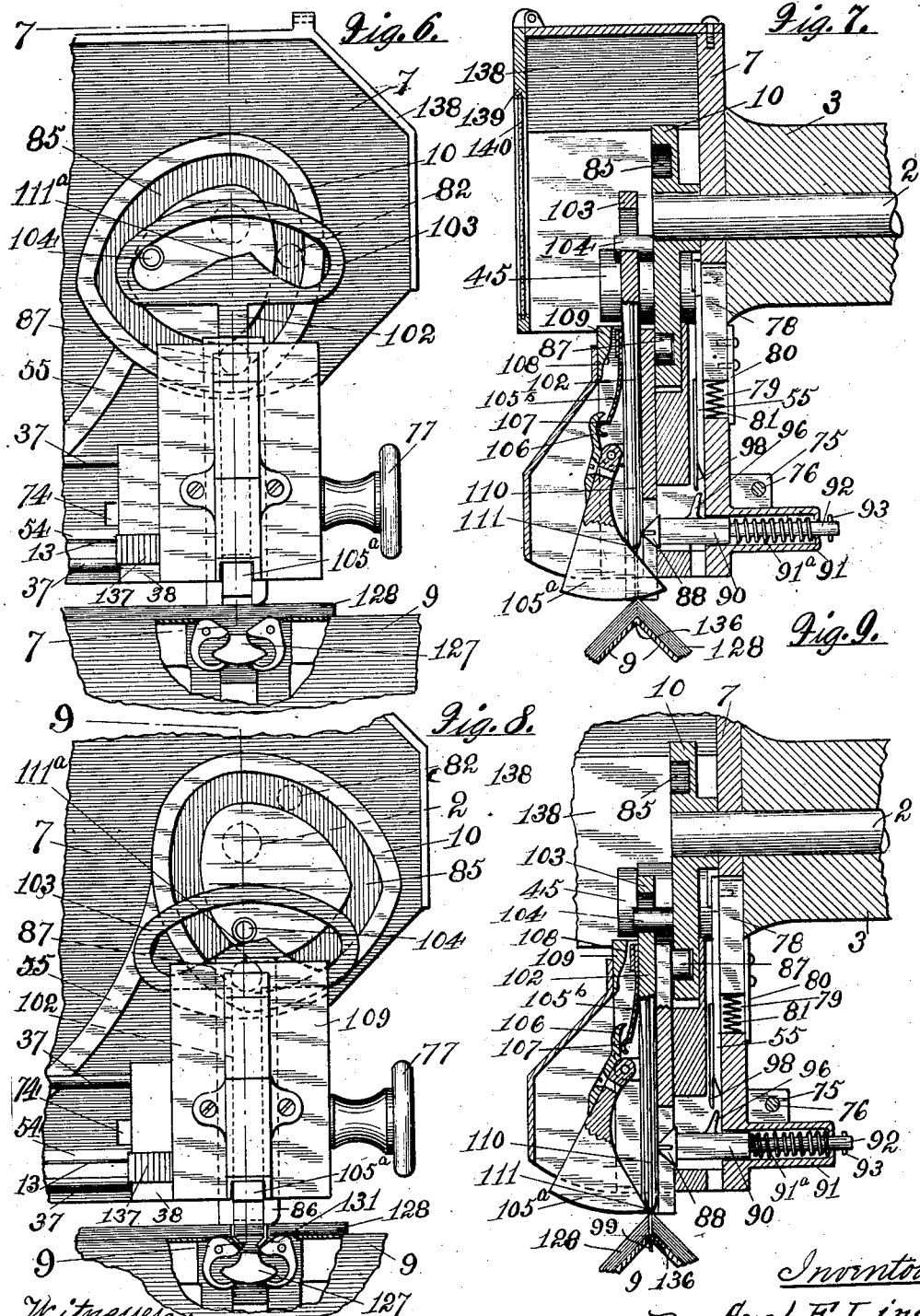

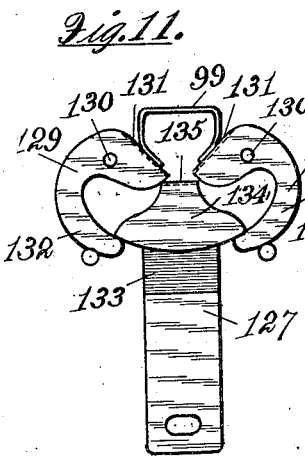
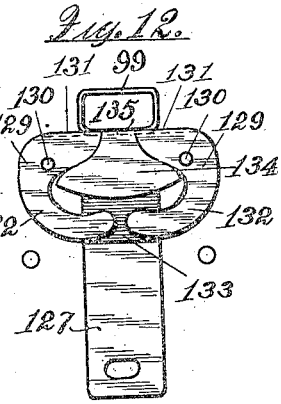
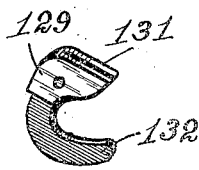
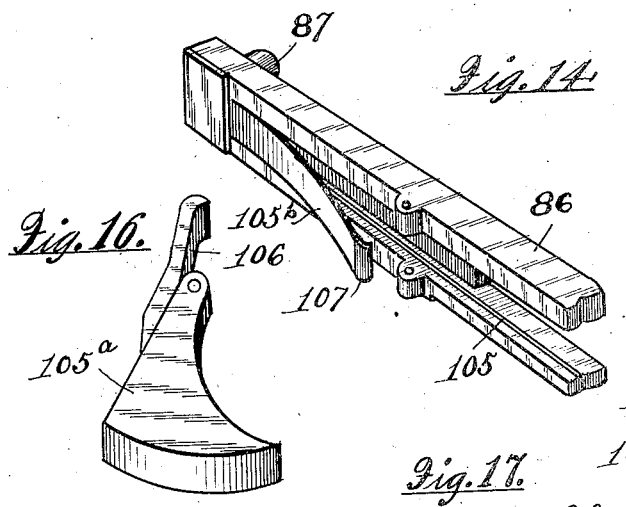

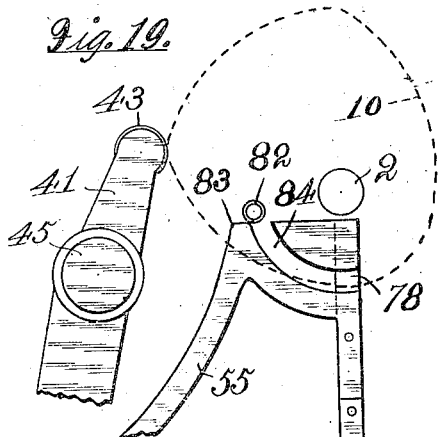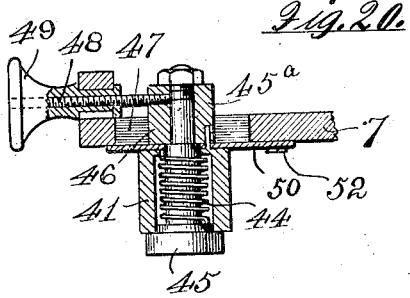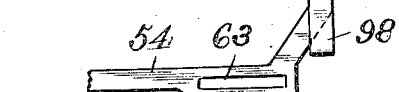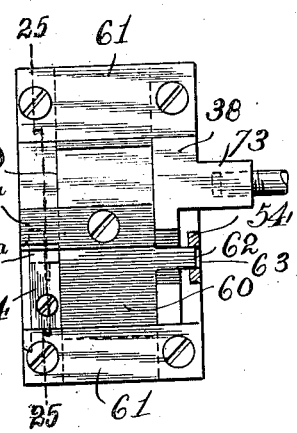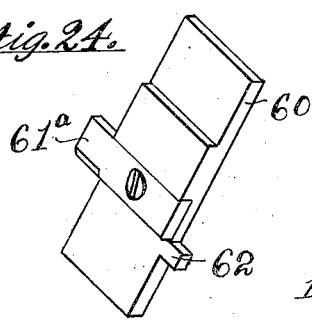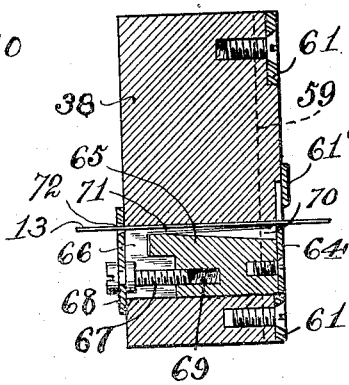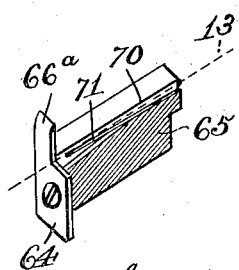

UNITED STATES PATENT OFFICE.

AXEL E. LIND, OF CHICAGO, ILLINOIS, ASSIGNOR TO GALLAHER AND SPECK, OF CHICAGO, ILLINOIS, A COPARTNERSHIP.

BOOK-STAPLING MACHINE.

No. 832,681.  Specification of Letters Patent.  Patented Oct. 9, 1906.

Application filed February 6, 1905. Serial No. 244,445.

*To all whom it may concern:*

Be it known that I, AXEL E. LIND, a citizen of the United States, residing at Chicago, in the county of Cook and State of Illinois, have invented certain new and useful Improvements in Book-Stapling Machines; and I hereby declare the following to be a full, clear, and exact description of the invention, such as will enable others skilled in the art to make and use the same.

My invention relates to an improved machine for stitching books or the like with wire staples, and particularly that class of machines which automatically feeds and cuts the wire and forms and drives the staples; and it consists in the features of construction and combinations of parts hereinafter fully described and claimed.

In the accompanying drawings, illustrating my invention, Figure 1 is a side elevation of a machine made in accordance with my invention having a portion broken away and the cover of the stitching-head removed in order that the working parts may be more clearly seen. Fig. 2 is a front elevation of the stitching-head and accompanying parts. Fig. 3 is a fragmentary view similar to Fig. 2, but showing the feed mechanism at the opposite limit of its movement to that shown in Fig. 1. Fig. 4 is a detail horizontal section on the line 4 4 of Fig. 3, but showing some parts in slightly different positions. Fig. 5 is a side elevation, partly in section, of the vise for clamping the wire while it is being cut and the staple is being formed. Fig. 6 is a fragmentary front elevation similar to Fig. 3, but showing the staple-driving plunger in an intermediate position. Fig. 7 is a fragmentary vertical section on the line 7 7 of Fig. 6. Fig. 8 is a fragmentary front elevation similar to Fig. 6, but showing the staple forming and driving plungers at the extreme lower limit of their movement. Fig. 9 is a fragmentary vertical section on the line 9 9 of Fig. 8. Fig. 10 is a detail fragmentary view of the staple-forming plungers and heads in the position where the staple is completed. Figs. 11 and 12 are enlarged views of the staple-clenching head, shown in positions similar to those shown in Figs. 8 and 10, respectively. Fig. 13 is a detail perspective view of one of the clenching-jaws. Figs. 14, 15, 16, and 17 are views showing various details of the staple-forming mechanism. Fig. 18 is a central vertical section of the device for straightening the wire before it enters the feed mechanism. Fig. 19 is a fragmentary diagrammatic view of a portion of the feeding and cutting mechanism. Fig. 20 is a fragmentary detail horizontal section on the line 20 20 of Fig. 3. Fig. 21 is an enlarged detail vertical section on the line 21 21 of Fig. 3. Fig. 22 is a detail vertical section of the movable clamp of the feed mechanism on the line 22 22 of Fig. 21. Fig. 23 is an enlarged side elevation of the adjustable block which carries the cutting mechanism. Fig. 24 is a perspective view of the member which carries the movable knife. Fig. 25 is a vertical section on the line 25 25 of Fig. 23. Fig. 26 is a view in perspective, partly in longitudinal section, of the adjustable member to which the stationary knife is secured.

In machines of this kind, the wire from which the staples are formed is carried by the machine on a spool and is drawn therefrom by the feed mechanism which feeds the wire forward sufficient for each staple as the same is required. After the feed mechanism has come to rest the wire is cut and the staple is formed from the severed end, driven through the book, which has been placed in proper position by the operator, and the free ends are then bent over and clenched on the opposite side of the book, thus securely fastening the staple in place.

My invention relates more particularly to improvements in the details of the various devices by which the different steps are performed, to the end that the necessary adjustments to sew books of different thicknesses can be more easily and accurately made and also the work done by each device will be more accurate and satisfactory.

In order that my invention may be more clearly understood, I will now call attention in detail to the particular points wherein my machine is an improvement over others.

As the wire which is used for this purpose is rather stiff, it acquires a certain set or curvature by being wound on the reel by means of which it is mounted upon the machine, and it is consequently necessary to straighten the wire to a small extent, so that as it is fed into the machine the free end will follow the proper course. To accomplish this, I have provided a very simple straightening device which is easily and quickly adjustable to guide the wire in relation to the feed mechanism in such a manner that any tendency which the wire might have to spring out of the proper course will be destroyed. The next step is the feeding of the wire. This is usually accomplished as in my machine by a stationary and a reciprocating head, each provided with a clamping device. I have provided means whereby the clamping device carried by the reciprocating head is positively opened after the wire has been moved forward, so that as the head returns to its original position the clamp does not drag on the wire, but passes freely over same. As the wire passes through the staple-forming device the free end sometimes springs out of its proper path, due to slight irregularities, and to prevent this I have provided a guide which forces it positively into its proper position. In driving a wire staple of this kind it is necessary to support the staple on all sides until it enters the material it is being driven into, so that it will not bend or buckle. To accomplish this, a movable head is required which will enter between the prongs of the staple and be forced out of the path of said staple as it is driven. One portion of my invention consists in providing improved means for positively holding said movable head out of the path of the staple until just as it is formed. After the staple is driven it is necessary to hold same firmly in position while the free ends are being bent over, so that the staple will have the proper form when finished. I provide means whereby the plunger which drives the staple is positively held against the head of the staple until the ends have been turned.

One important portion of my invention relates to the particular means used for bending the free ends of the staples to clench same. It is necessary to provide a small pocket into which the ends of the staple may project as it is driven through the book, and as the clenching mechanism has been formed heretofore this pocket would get clogged with portions of wire and paper, and thus prevent the clenchers from operating properly. In my device I form the clenchers in such a manner that anything which might enter said pocket will be forcibly ejected every time that a staple is clenched without doing any harm to the apparatus.

To these and other ends I have provided the machine which is clearly illustrated in said drawings, in which—

1 is a hollow standard or support, in the upper end of which the drive-shaft 2 is mounted in suitable bearings 3 and 4. A drive-pulley is mounted on the rear end of said shaft 2, and a clutch 5 is provided, operated by a foot-lever 6, by means of which said pulley may be thrown into engagement with said shaft, as desired, to rotate the same in a well-known manner. A face-plate 7 is secured to the forward end of said bearing 3, which is adapted to carry the operating mechanism for feeding and cutting the wire and forming and driving the staple. A bracket 8, integral with said standard 1 and below said bearing 3, is adapted to carry suitable plates 9, upon which the book to be stapled may be placed in position to receive the staple. Said bracket 8 also carries the clenching devices, which will be described hereinafter.

I will now proceed to describe the mechanism for feeding and cutting the wire and forming and driving the staples in the order mentioned.

Said drive-shaft 2 is provided on its forward end adjacent said plate 7 with a cam 10, which is adapted, by means of cam-grooves and surfaces and crank-pins carried on its front and rear faces, to operate the feeding, cutting, forming, and driving mechanism which is mounted upon said plate 7. Said plate 7 carries a horizontally-projecting arm 11 at one side, upon the outer end of which a reel 12 is revolubly mounted, which carries the wire 13, from which the staples are to be made. Said reel is prevented from revolving too freely by means of a spring-washer 14, which is secured on the end of the spindle upon which said reel is mounted. Said wire 13 is guided from said reel to the operating mechanism through a curved tube 15, which is carried by a horizontally-disposed arm or rod 16, slidingly mounted in a tube or bracket 17, integral with said arm 11. Said arm 16 is held at one limit of its movement by means of a spring 18, mounted within said bracket 17, and is adapted to be drawn toward the plate 7 as the wire is fed into the machine in order that the feed mechanism may be relieved of the strain of starting the reel into motion in an obvious manner. To straighten the wire before it enters the feed mechanism, it is first passed through the wire-straightening device 19, which comprises rolls 20, mounted one above the other in a frame 21 and each provided with a groove in its outer surface, said grooves coacting to form a passage or guide for the wire between the meeting faces of the rolls. Said frame is adjustably mounted on a bracket 22, which is integral with a portion of the feed device, by means of a horizontally-disposed trunnion 23, integral with said frame 21, and which is adapted to be held in a cylindrical opening in the free end of said bracket 22 by means of the set-screw 24. To adjust said frame 21 and rolls 20 to give the wire the desired set, said frame may be revolved in a vertical plane about said trunnion as a center, as illustrated in Fig. 18. It may also be adjusted toward or away from the plane of said plate 7, thereby guiding the wire in the desired direction through the feed apparatus by sliding said trunnion endwise through its support.

As said wire leaves the straightening device 19 it enters the feed mechanism, which is in horizontal alinement therewith and which I will now describe. Said feed device is adapted to feed the wire a predetermined amount to the forming and driving plungers at intervals and comprises a stationary clamping device 25 and a movable or reciprocating clamping device 26. Said stationary clamping device comprises a block or head 27, which is horizontally adjustably mounted on said plate 7 and is provided on one side with the bracket 22, upon which said straightening device 19 is mounted. Said head 27 is provided adjacent its lower end with a horizontally-disposed shelf 28, over which said wire 13 is adapted to be drawn. Each end of said shelf is provided with projections 29, between which said wire is adapted to pass and be guided thereby over said shelf. To grip said wire in said stationary device 25, a swinging lever 30 is pivotally mounted on the face of said head 27 above said shelf and is provided in its lower end with a hardened cylindrical jaw 31, adapted to bear on the wire 13 and grip the same between said jaw and said shelf. To effect this, the total length from the pivot of the lever 30 to the extreme point on the periphery of said jaw is slightly more than the perpendicular distance from said pivot to the upper surface of the wire as said wire lies upon said shelf, and said lever is free to swing in a forward direction to free the wire as it is drawn through said clutch. To force said clutch to grip the wire and prevent any tendency to its moving backward through same, a spring 32 is provided, one end of which is secured to said lever 30 near its free end and the opposite end to a post 33 near the upper end of said head 27 and is so arranged that it will normally hold said jaw 31 in contact with said wire and in position to grip same. Said jaw 31 is made cylindrical, so that there will be provided the largest number of teeth to be used for gripping said wire, and as the teeth which are in use become dull said jaw may be rotated in said lever to bring a different portion into action, thus in time making use of the whole periphery. To hold said jaw from revolving when gripping the wire and also to permit of its rotation through a space equal to the distance between two or more teeth when desired, a clamp 34 is secured on the edge of said swinging lever 30 by means of the screw 35, its free end being adapted to engage the periphery of said jaw. Said reciprocating clamping device 26, which is adapted to grip the wire and carry it forward the predetermined distance when it is moved in one direction, comprises the head 36, which is horizontally movably mounted on the two horizontal guide-rods 37, which are rigidly mounted in said head 27 at one end and in a second stationary head 38 at their other ends. Said second stationary head is adapted to carry the cutting mechanism, which will be described later. Said head 36 is provided with a swinging lever 39, a cylindrical jaw 40, and a clamp 40ª, similar to those on said head 27. Said reciprocating clamping device is normally held in contact with said stationary clamping device 25, so that as it begins to move forward and feed the wire it will always begin to move from a definite relative position. The length of the staple is determined by the distance that said reciprocating clutch 26 is moved forward or away from said stationary clutch 25 at each revolution of the drive-shaft 2. To feed the wire forward at definite times in relation to the working of the other parts of the machine, an oscillating lever 41 is pivotally mounted between its ends on said plate 7 above said clutch members and is bifurcated at its lower end to embrace a horizontally-projecting pin 42, rigidly mounted in the back of said reciprocating head 36, whereby when said lever is moved in one direction said clutch device 26 will be moved forward to feed the wire. The upper end of said lever 41 is provided with an antifriction-roller 43, which is adapted to be engaged by the periphery of said cam 10 at intervals, whereby said lever 41 will be moved in one direction the required distance. To return said lever 41 to its original position, and consequently said reciprocating clutch 26 into contact with said stationary clutch 25, a coiled spring 44, Fig. 20, is provided, one end of which engages the head of the pivot 45, upon which said lever 41 is mounted, and the other end engages said lever, said spring being mounted within the hub of said lever. In order that said lever 41 may be adjusted to feed the desired length of wire, it is mounted so as to be adjusted from and toward said cam. As it is moved toward said cam the cam as it revolves will engage said roller sooner and oscillate said lever through a greater arc, and consequently move said reciprocating head a longer distance, and vice versa. To accomplish this, said lever 41 is mounted on a plate 45ª, Fig. 20, which is adjustably mounted on the back of said plate 7 and is provided with a projection 46, adapted to fit a horizontal slot or opening 47 in said plate 7. Said plate 45ª is adjusted by means of a screw-threaded projection 48, which is adapted to be engaged by a hand-wheel 49, which is revolubly mounted on the back of said plate 7 and is held against relative longitudinal movement, said pivot-pin 45 being rigidly mounted in said plate 45ª in an obvious manner. In order to be able to adjust said lever 41 so as to produce staples of a definite length, I provide a plate 50, mounted on said pivot 45 between said lever and said plate 7, on which a horizontal scale 51 is engraved or marked in any suitable manner. A stationary pointer 52 is mounted on said plate 7 adjacent said scale, so that the position of said lever 41 may be accurately determined. The divisions of said scale may be such as to indicate staples of a proper length for books of definite thicknesses or to indicate staples of a certain definite length. In the operation of similar feed mechanism it sometimes occurs that the wire clutch on the reciprocating head will not let go of the wire as it begins its return movement on account of the teeth of the clutch being wedged so firmly into the wire. I have provided means to overcome this difficulty which positively open said clutch at the forward limit of its movement and also a means for positively closing it again at the opposite limit of its movement or when it is brought into contact with said stationary clutch. I provide a lever 52$^a$, pivotally mounted between its ends on the side face of said head 36, which is opposite to said stationary head 27, and which lever 52$^a$ is adapted at one end to project beneath a horizontal pin or projection 53, rigidly mounted on the edge of said swinging lever 39, and at its opposite end projects close to said plate 7 and beneath a horizontal bar 54. As said bar 54 is depressed said lever 52$^a$ is adapted to be engaged by same and as it is turned on its pivot to engage said pin 53 and raise same, thus positively opening said clutch. Said horizontal bar 54 forms one side of a triangular frame 55, which is mounted on the face of said plate 7, the detailed description of which will be taken up later. To positively close said clutch when it is brought into contact with said stationary head 27, a lever 56 is pivotally mounted between its ends in the upper end of said swinging lever 39, one end of which is adapted to bear upon the periphery of said jaw 40 to limit the movement of said lever in one direction, and its opposite end is formed to project at an angle slightly above the horizontal, being curved on its under side, and is adapted to engage a pin or projection 57, which is mounted on the face of said head 27 in the path of said lever. A spring 58 is provided, one end of which is secured to the upper end of said swinging lever 39, and its free end is adapted to engage the outer end of said lever 56 and normally hold the opposite end in contact with said jaw 40. As said reciprocating clutch is brought into contact with said stationary head 27 said lever 56. engages said pin 57 and said jaw 40 is forced to clutch said wire in an obvious manner with a spring-pressure. Said head 38, between which and said head 25 said reciprocating head 36 is adapted to be moved, carries the knives for cutting the wire, whose arrangement and operation I will now describe. Said head 38 is provided on its face opposite to said head 25 with a vertical recess or groove 59, in which a slide 60 is vertically movably mounted, being held in place by bars or straps 61, secured to said head 38 at its ends and beneath which said slide 60 is adapted to be reciprocated. Said slide is narrower than said head and is located between the path of said wire and said plate 7 and carries a knife 61$^a$, rigidly mounted on same adjacent its middle portion and projecting at its forward end above the path of said wire. Said slide is provided with a horizontal projection 62, which projects rearwardly close to the face of said plate 7 and into a horizontal slot 63 in said bar 54, by means of which it is adapted to be reciprocated vertically. The stationary knife 64 is rigidly mounted on one end of a block 65, which is mounted within a recess or opening 66 in the lower end of said head 38 beneath the path of said wire 13 and is adjustable horizontally in relation to the path of said movable knife, so that said knives may be kept in close contact. Said knife 64 is provided with an upward extension 66$^a$ at one side of the cutting edge, which remains at all times beneath said movable knife and is beveled on its upper end, thus preventing said movable knife from catching on its upper end or the cutting edge of said stationary knife, regardless of the pressure with which they are forced together. Said block 65 is held in its position and adjusted horizontally by means of a screw 67, which is revolubly mounted in a plate 68 opposite the rear end of said block 65 and is adapted to engage a screw-threaded opening 69 in said block 65. In order that said stationary knife may be sharpened without destroying its usefulness, a longitudinal slot 70 is provided in the upper side of said block 65 beneath the wire and deeper adjacent said knife 64, so that as said knife is ground down the movable knife may depress the wire into contact with same. To return the severed end of said wire to its normal position, so that as it is fed forward into the forming devices it will be guided in the right direction, a light spring 71 is provided, secured at one end in the rear end of said slot 70 beneath the path of said wire, and its forward end is adapted to force said wire into contact with the upper wall of said opening 66 with a very light pressure. Said plate 68 is provided with a small opening 72 in the path of said wire, through which said wire is guided into the rear end of said slot 70.

To feed and cut the wire to form staples of different lengths, it is necessary to adjust the feed mechanism to feed the wire the required amount and also to adjust the position of the knives in relation to the forming mechanism to cut the wire at the proper point. To effect the adjustment of the position of the knives in relation to the forming mechanism, said heads 25 and 38, which are united by said guide-rods 37, are each provided with a projection 73 on their rear face, which fit in horizontal slots 74 in said plate 7 and are rigidly secured to a horizontal bar 75, which is mounted adjacent the rear face of said plate 7. Said bar 75 carries a horizontal threaded projection 76 at one end, which is adapted to enter the threaded central opening of a hand-wheel 77, which is revolubly mounted on the back of said plate 7. Said wheel is held against relative longitudinal movement in relation to said plate 7 in a well-known manner and by revolving same said bar 75, and consequently said heads 25 and 38, may be adjusted horizontally. Said triangular frame 55, which operates said knife 61$^a$ and said lever 52$^a$, is quite thin and lies flat against the face of said plate 7 behind all other moving parts and is held securely in its proper relative position by means of a projection 78, secured to its rear face, which fits a vertical slot or opening 79 through said plate 7 and directly below said shaft 2. A plate 80 is secured on the rear end of said projection 78 and serves to hold said frame 55 in place and cover the lower end of said slot 79, in which a compression-spring 81 is mounted below said projection 78, which normally holds said frame 55 at the upper limit of its movement. Said frame is depressed by a crank-pin 82, which is secured to the rear face of said cam 10 and which engages a projection 83 on the upper end of said frame 55, as illustrated in Fig. 19. A curved cam-slot 84 is provided in the upper end of said frame 55 eccentric to said shaft 2 and adapted to receive said pin 82 in its upper end when said frame 55 has been depressed. To return said frame 55 to its normal position positively, said cam-slot 84 is so placed that after said pin 82 has entered its upper end said pin will engage the upper wall of said cam-slot and raise said frame, so that as said pin leaves said slot at a point nearly vertically beneath said shaft 2 said frame will have reached its normal position and will be retained in said position by said spring 81 until again depressed by said pin 82. The pin 82 is so placed on said cam 10 in relation to that portion of the periphery of the cam which holds the lever 41 at one limit of its movement that the releasing-lever 52$^a$ and the knife 61$^a$ are operated after said lever 41 has come to rest and before it has been permitted to return to its normal position.

Having described the feeding and cutting mechanism and the operation of same, I will now describe that part of the machine which forms and drives the staples.

Said cam 10 is provided with a cam-groove 85, which is adapted to operate the forming-plunger 86, reciprocating said plunger vertically in its guide 86$^a$, which is mounted on said plate 7 below said shaft 2, and holding it at its upper and lower limits of movement during about sixty degrees of the revolution of said cam, said plunger being provided with a horizontally-projecting pin 87, which enters said cam-groove 85. The relation between said cam 10, said pin 87, and said lever 41, and said pin 82 is such that said plunger 86 is held at the upper limit of its movement until after said wire has been cut from which to form the staple and it begins to descend before said frame 55 has reached the upper limit of its movement, the reason for which I will now explain. When said wire is being cut, the portion which is to be formed into a staple has to be firmly held in its position in relation to the forming devices. To accomplish this, a bifurcated jaw or head 88 is provided which is normally held with the slot or bifurcation 89 in the path of the wire and also in the path of said forming-plunger 86, which is provided with a central opening extending from its lower end in order that it may straddle same. Said jaw or head 88 is integral with a shank 90, which extends rearwardly and enters a sleeve or pocket 91, mounted on the rear face of said plate 7. Said shank has a reduced rear end 92, which passes through a central hole in the rear head of said sleeve 91, its outer end being provided with a laterally-projecting pin 93, which is arranged to limit the forward movement of said head 88. Within said sleeve 91 a spring 91$^a$ surrounds the reduced portion 92 of said shank 90 and tends to normally hold said head 88 at the forward limit of its movement. The central upper portion of said head 88 is cut away and an auxiliary jaw 95 is inserted in said space, being pivotally secured to said shank 90 and provided with an upward projection or tail 96, which projects adjacent to said plate 7. Within said slot 89 is mounted a flat spring 97, which tends to hold said auxiliary jaw 95 raised sufficiently to admit the wire, and after the same has been fed into place said projection or tail 96 is adapted to be engaged by the stiff spring-tongue or projection 98, which is rigidly mounted at its upper end on the frame 55, which is descending at that instant to cut off the wire. Said spring 98 engages said projection 96 on its rear surface, and thus forces same forward, and consequently depresses the forward end and causes same to hold the wire as in a vise. Directly after the wire has been cut and before said spring 98 has been released from said projection 96 said forming-plunger 86 begins to descend and the ends of the staple 99 are bent down, as shown in Fig. 3. Sometimes it occurs that in cutting the wire or for some other reason the end is bent or sprung to one side or the other and as it passes through said head 88 the end has a tendency to pass horizontally out of its direct path. To prevent this action, as the wire passes through said head 88 said spring 97 is made so that its free or forward end adjacent the path of said wire practically fills said passage or opening 89. As the end of the wire leaves said head 88 it enters between the face of said guide 86ª and the inner surface of a lever 100, which is pivotally mounted in a recess in the face of said guide, their meeting faces adjacent the forming-plunger in line with said wire being divergent, as shown in Fig. 4, so that as the end of the wire enters between same it will be guided in its proper direction, which is in alinement with the previous path of said wire. The outer lower corner of said forming-plunger is rounded, and said lever 100 is curved, so that its lower end can extend around said rounded corner and abut against said head 88. As said forming-plunger 86 begins to descend from its upper position, as indicated in Fig. 3, said lever 100 is pushed out of the path of said plunger against the action of a spring 101, which tends to hold the lower end of said lever against said head 88 and assumes the position shown in Fig. 3.

In Figs. 6, 7, 8, and 9 I have illustrated two different positions of the forming and driving mechanism. Mounted within said forming-plunger and longitudinally movable therein is a driving-plunger 102, which extends above the upper end of same and ends in a cam-yoke 103, the inner periphery of which is adapted to be engaged by a crank-pin 104, carried on the outer face of said cam 10, to reciprocate said plunger to drive the staple after it has been formed. Said forming-plunger 86 is provided with small longitudinal grooves 105 on the inner faces of its legs, which are adapted to receive the legs of the staple as said plunger descends, the loop of the staple being held in said vise-head 88. As said forming-plunger descends it engages the ends of the staple-wire at each side of said head 88, and bends them downwardly to a vertical position and against the side faces of a staple-supporter 105ª. Said supporter is a triangular-shaped block and is pivotally mounted at its apex on the outer face of said plunger 86 and above the lower end of same. Said supporter is adapted to enter between the prongs of the staple just as said staple is formed and hold same firmly in said grooves 105 while said staple is being driven. The inner edge or face of said supporter, which is concave curved, is adapted to be engaged by said driving-plunger as said plunger descends, and thereby cause said supporter to swing out of the path of said plunger. The lower end of said supporter is concentric with its pivot and is adapted to swing out from between the prongs of said staple just above the paper into which the staple is being driven. The lower ends of the legs of said former-plunger are adapted at the lower limit of movement of said plunger to press upon the article being stapled and hold same firmly while the staple is being driven. Said supporter 105ª is normally held in the position illustrated in Fig. 7 by means of a flat spring 105ᵇ, which is secured at one end to the upper end of said former-plunger 86 and is adapted to engage the rear face of a curved projection 106 on the upper end of said supporter, and thereby force the lower end of same rearwardly. The free end of said spring is rounded, as shown at 107, so that as said supporter changes its position it can slide freely on the surface of said projection 106. As the lower end of said supporter is forced out of the path of said driving-plunger said spring 105ᵇ, which necessarily is quite stiff, is straightened out and naturally becomes much stronger. At the same time very little pressure is required to hold said supporter in its position; but as said spring is straightened its lower end is brought nearer the pivot of said supporter, and consequently exerts less power to hold the lower end of same rearwardly. The relation between said cam-groove 85 and cam-yoke 103 and crank-pin 104 is such that as said forming-plunger 86 begins to ascend after the staple is driven said driving-plunger follows more slowly, thus holding said staple-supporter in its outer position until as said former-plunger continues to rise said projection 106 will engage the cam-surface 108, which is formed in the inner surface of a cap or casing 109, mounted on the face of said guide 86ª. Said projection will thus be forced toward the face of said forming-plunger and the supporter thereby swung a slight distance farther out, and it is thereby held entirely out of the path of said driving-plunger. Said driving-plunger is provided on its side edges with small tongues or longitudinal projections 110, adapted to fit within said grooves 105 and be accurately guided thereby. The lower end or point of said driving-plunger is provided with a lateral groove 111, adapted to partly embrace the loop of the staple to hold same steadily in place while it is being driven. As said driving-plunger begins to descend it engages the upper beveled surface of said vise-head 88 and forces same back against the action of said spring 91ª out of its path, engaging the loop of the staple as said head 88 is withdrawn from same. Said supporter is then forced out of the path of the loop of the staple and of said driving-plunger by the pressure of same on the rear concave surface of said supporter. To hold said driving-plunger firmly against the book while the clenching-levers are operating, which occurs immediately after the staple has been driven, the lower portion of said cam-yoke 103 is formed with a small portion of its periphery straight, but at a slight angle to the horizontal, as shown at 111ª, Fig. 3. As said crank-pin 104, which actuates said plunger, moves over said surface 111ª, as shown in Fig. 8, it will force said plunger down tightly against the book and hold it there for a short interval of time.

The clenching apparatus is mounted in the outer end of said arm or support 8 and is operated by a cam 112, mounted on said shaft 2 within said standard 1, through a vertical rod 113, mounted in guides 114 within said standard and provided at its upper end with an antifriction-roller 115, revolubly mounted therein, which is held in contact with the periphery of said cam by a compression-spring 116, surrounding the lower end of said rod 113 and bearing on the upper surface of one of said guides 114 and at its other end against a collar 117, rigidly mounted on said rod. A horizontal lever 118, pivoted between its ends in said arm 8, transmits motion from said vertical rod 113 to a vertical rod 119, which is mounted centrally in the outer end 120 of said arm 8 and vertically beneath said driving-plunger. A cylindrical column or shaft 121 is mounted in the upper end of the outer end 120 of said arm 8 concentric with said rod 119 and carries at its upper end a triangular-shaped head 122, within which the clenching-levers are mounted. Said plates 9 are hinged together at their meeting edges and are supported on the inclined faces of said head 122, but may be raised to a horizontal position, as indicated in dotted lines in Fig. 1, and are supported in said horizontal position by hinged braces or struts. Said cylindrical column 121 is provided at one side with a projection 123, adapted to project through an opening in the wall of said arm immediately over a similar projection 124, integral with said arm, and said column 121 is adjusted vertically by means of a hollow screw 125, mounted in the lower end of the outer end 120 of said arm 8, said screw being provided with a hand-wheel 126. Said rod 119 passes centrally through said screw and carries at its upper end within said head 122 the reciprocating plunger 127 of the clenching device.

In Fig. 11 is shown the position of the parts of the clenching device in their normal position of rest, which they occupy up to the time that the staple is driven through the book 128, as shown in smaller size in Fig. 8. In Fig. 10 is shown the final position of the forming and driving plungers and the clenching device at the instant of completing the staple. There are three parts in the clenching device—the vertically-reciprocating plunger 127 and the two swinging levers 129, which are pivotally mounted one at each side of said plunger 127 on one wall of said head 122 on the pivots 130. Said swinging levers 129 are provided in one portion of their periphery with a straight portion 131, which stand opposing each other and inclined at an angle of about forty-five degrees and in such a relation to the driving-plunger that the ends of the staple as same are driven through the book will be received on said inclined surfaces and be bent toward each other. Said levers 129 are provided with inwardly-curved tail portions 132, which are received in a cut-away portion 133 of said plunger 127, said portions 132 of said levers being cut away on one side, as shown in Fig. 13, so that they can pass the body of said plunger 127. Said plunger 127 is provided with a T-shaped head 134, having a narrow upward central projection 135, adapted as said head is forced upward to swing said levers on their pivots and raise their straight surfaces to a horizontal position, as shown in Fig. 10 and also in Fig. 12 on an enlarged scale. Said head is widened out just below its upper end with reversely-curved arms, and the under surface of said levers 129 are formed to fit said curves, thus making the extreme points of said levers as strong as possible. The lower surface of said T-head 134 is quite round laterally and is adapted to allow said curved tails of said levers to be turned beneath same as said plunger is raised and to engage said curved ends and force said levers back to their normal positions as said plunger descends. It will be noted that the formation of the contacting surfaces of said head 134 and said levers 129 is such that at no position is there any appreciable opening between same to permit of any foreign matter finding lodgment therein; also, that when the staple is completed, as shown in Figs. 10 and 12, the whole upper surface of the clenching mechanism is level and continuous without any openings in which anything can remain. A central groove is provided in the upper surface of said head 134 and levers 129 to assist in guiding and forming the staple in an obvious manner. A central narrow opening 136 is provided between said plates 9 to allow said clenching mechanism to operate.

In adjusting my machine to stitch a book the part to be stitched and through which the staple is to be driven is first placed between the projections 123 and 124, and said head 122 is lowered until said projections are brought to bear on said book with the right degree of pressure, thus setting said head 122 and the clenching mechanism at the proper height in relation to said driving and forming mechanism so that the staple will be properly driven. The thickness of said book is noted, and the head 38, which carries the cutting-knives, is adjusted horizontally to its proper position to cut a staple of the proper length. This adjustment is assisted by means of a scale 137, provided on the face of said head 38 and which appears from under the edge of said casing 109 as said head 36 is moved to cut longer staples. The position of said lever 41 is then adjusted to feed the wire a proper distance.

A casing 138 is provided to cover the working parts which are mounted on said plate 7, and a door 139 is hinged to the front of said casing, provided with glass 140, through which the various parts may be seen to facilitate the making of the necessary adjustments.

I claim as my invention—

1. In a machine of the kind specified, a staple-forming device comprising a vise adapted to engage the middle portion of the wire to be formed and hold the same, a reciprocating forming-plunger adapted to straddle said vise and engage the end portions of said wire and bend same to form the staple, a swinging block pivotally mounted on the face of said plunger, its free end being adapted to enter between the legs of said plunger and between the legs of said staple as same is formed, a curved projection on said block adjacent to and extending above its pivot at all positions of the block, a spring carried by said plunger and extending between the plunger and said projection its free end being adapted to engage said projection and hold said block in position between the legs of said staple, and a stationary member having a cam-surface disposed at an angle to the face of the plunger and carried by said machine in the path of said projection adjacent one limit of its motion and adapted to engage same and hold said block out of the path of said driving-plunger and out of contact with said vise.

2. In the staple-forming device of a machine of the kind specified, the combination with the bifurcated forming-plunger, of a swinging block pivotally mounted on the face of same its free end being adapted to enter between the legs of the staple as same is formed said block having a curved projection adjacent its pivot end, a spring carried by said plunger its free end engaging said projection and adapted to hold said block so that its free end is held between the legs of said plunger and staple, and a stationary member having a cam-surface adapted to engage said projection as said plunger approaches one limit of its movement and move said block out from the plunger and hold said block against the action of said spring out of the path of said plunger.

3. In a machine of the kind specified, the combination with the forming device, of a spring-actuated lever mounted on said machine its free end adjacent the path of said wire, as said wire is fed through said forming device the free end of said lever being beveled on the surface presented to said wire and adapted to guide the end of said wire in its proper course, said lever being free to be pushed out of the path of the forming-plunger as same descends to form the staple.

4. In the clenching device of a machine of the kind specified, the combination with a reciprocating plunger provided with a T-shaped head, said head being formed narrow at its apex and having reversely-curved side edges, of a pair of bell-crank levers pivotally mounted one on each side of said plunger and in the plane of said head and having a portion of their outline adapted to fit within said reversely-curved edges of said head, each of said levers being provided with a flat surface disposed at an angle in the path of said staple, as same is driven and adapted to receive the points of the prongs of said staple and force them toward each other, said plunger being adapted to turn said levers so that their flat surfaces are brought in line and at a right angle to the path of said staple, the apex of said T-head being flat and adapted when said flat surfaces of said levers are in line to lie in the same plane whereby the prongs of said staple will be firmly clenched against the surface of the article being stapled.

5. In a machine of the kind described, a vise for holding the staple-wire while the staple is being formed, comprising a head movable into and out of the path of the staple-driver, said head being provided with a slot in the path of the wire adapted to receive same, a bell-crank lever pivotally mounted on the shank of said head one end being adapted to extend into a slot in said head and above the path of the wire, operative means adapted to engage the opposite end to cause said lever to engage said wire, and a spring mounted within said shank said spring being attached at one end to the said lever and bearing at its free end on the bottom of the slot in the head and adapted to normally hold said lever out of the path of said wire, the free end of said spring serving to limit the movement of the wire laterally in the head.

6. In a machine of the kind specified, clenching devices and means for operating same, said clenching devices comprising a plunger provided with a flat T-shaped head having a flat upper face, a reversely-curved face at each side and a convex lower face, a clencher-jaw pivotally mounted at each side of said head and each provided with an inclined flat upper face, a lower face adapted to fit into one of said curved side faces of said head when said inclined flat faces and said flat upper face of said head are brought into a coincident plane to clench the staple, and a curved tailpiece adapted to extend beneath said convex lower face of said head, said levers being adapted to be operated by the movement of said plunger.

7. In a machine of the kind specified, the combination with staple forming and driving mechanism, of a staple-clenching device comprising a reciprocating plunger having a T-shaped head with a parallel projecting flat-topped central portion, a lever pivotally mounted adjacent each side of said head, each of said levers being provided with a flat surface normally held at an angle to the direction of motion of the staple as it is driven, and adapted to receive same, said levers being adapted to be turned on their pivots by said T-head to bring their flat surfaces into a coincident plane and thus bend the prongs of said staple, the contacting surfaces of said levers and said T-head being formed to prevent the ingress of any foreign material between same at any relative position of said members.

8. In a machine of the kind specified, the combination with a wire-feeding device, including a stationary wire-clamping device and a reciprocating wire-clamping device, a reciprocating knife and a vise adapted to hold the wire while the staple is being formed, of a reciprocating frame, means for reciprocating said frame at intervals, means connecting said frame and said reciprocating wire-clamping device, said vise being disposed in the path of movement of said reciprocating frame said frame being constructed and adapted as it is reciprocated to contact with and close said vise, open the reciprocating clamping device and operate said reciprocating knife in the order named.

9. In a machine of the kind specified, a frame adapted to be reciprocated at intervals, a vise for holding the staple-wire while the staple is being formed a reciprocating clamping device adapted to be opened at one limit of its movement, and a knife adapted to be reciprocated to sever said wire, operative connection between said vise, said reciprocating clamping device and reciprocating knife and said reciprocating frame whereby said vise, said clamping device, and said knife will be operated in the order named and said vise will be held in its closed position until the staple has been formed.

In testimony whereof I have signed my name in presence of two subscribing witnesses.

AXEL E. LIND.

Witnesses:
E. F. WILSON,
R. A. FISCHER